(12) United States Patent
Wang et al.

(10) Patent No.: US 11,252,070 B2
(45) Date of Patent: Feb. 15, 2022

(54) ADAPTIVE POLLING IN SOFTWARE-DEFINED NETWORKING (SDN) ENVIRONMENTS

(71) Applicant: VMware, Inc., Palo Alto, CA (US)

(72) Inventors: Dexiang Wang, Palo Alto, CA (US); Yong Wang, Palo Alto, CA (US); Peng Li, Palo Alto, CA (US); Sreeram Ravinoothala, Palo Alto, CA (US); Xinghua Hu, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 218 days.

(21) Appl. No.: 16/154,729

(22) Filed: Oct. 9, 2018

(65) Prior Publication Data
US 2020/0112500 A1 Apr. 9, 2020

(51) Int. Cl.
*H04L 12/26* (2006.01)
*H04L 12/931* (2013.01)
*G06F 9/455* (2018.01)
*H04L 12/715* (2013.01)

(52) U.S. Cl.
CPC ........ *H04L 43/103* (2013.01); *G06F 9/45558* (2013.01); *H04L 45/64* (2013.01); *H04L 49/70* (2013.01); *G06F 2009/45595* (2013.01)

(58) Field of Classification Search
CPC ....... H04L 43/103; H04L 49/70; H04L 45/64; H04L 43/0817; G06F 9/45558; G06F 2009/45595
See application file for complete search history.

(56) References Cited

U.S. PATENT DOCUMENTS

| | | | | |
|---|---|---|---|---|
| 6,735,629 B1* | 5/2004 | Cafarelli, III | ........... | H04L 43/12 709/223 |
| 6,977,895 B1* | 12/2005 | Shi | ........ | H04L 47/521 370/235 |
| 7,093,141 B2* | 8/2006 | Elnozahy | .............. | G06F 1/3209 713/300 |

(Continued)

OTHER PUBLICATIONS

Adaptive Query Rate for Anomaly Detection with SDN, Sahri et al., IJCSNS International Journal of Computer Science and Network Security, vol. 16 No.6, Jun. 2016 (Year: 2016).*

(Continued)

*Primary Examiner* — Javier O Guzman
(74) *Attorney, Agent, or Firm* — Su IP Consulting

(57) ABSTRACT

Example methods are provided for a network device to perform adaptive polling in a software-defined networking (SDN) environment. One example method may comprise: operating in a polling mode at a current polling round to detect zero or more packets that require packet processing by the network device. The method may also comprise: determining packet characteristic information associated with multiple polling rounds that include the current polling round and one or more previous polling rounds; and based on the packet characteristic information, determining whether a resource performance condition associated with the network device is satisfied. In response to determination that the resource performance condition is satisfied, the network device may operate in the polling mode at a subsequent polling round; but otherwise, switch from the polling mode to an interrupt mode.

18 Claims, 6 Drawing Sheets

(56) References Cited

U.S. PATENT DOCUMENTS

| | | | |
|---|---|---|---|
| 7,558,278 B2* | 7/2009 | Shi | H04L 47/521 370/235 |
| 10,310,917 B2* | 6/2019 | Kim | H04L 1/1832 |
| 10,547,521 B1* | 1/2020 | Roy | H04L 43/06 |
| 2004/0236880 A1* | 11/2004 | Barrett | G06F 11/0787 710/52 |
| 2008/0141261 A1* | 6/2008 | Machida | G06F 11/3495 718/104 |
| 2009/0089784 A1* | 4/2009 | Walters | G06F 9/4881 718/102 |
| 2012/0131095 A1* | 5/2012 | Luna | H04L 67/04 709/203 |
| 2013/0246350 A1* | 9/2013 | Thomas | G06F 12/0804 707/610 |
| 2015/0181617 A1* | 6/2015 | Luna | H04L 47/822 455/450 |
| 2015/0358236 A1* | 12/2015 | Roach | H04L 41/0896 370/235 |
| 2016/0094449 A1* | 3/2016 | Ramia | H04L 45/021 370/392 |
| 2016/0182342 A1* | 6/2016 | Singaravelu | H04L 43/103 370/253 |
| 2019/0238442 A1* | 8/2019 | McCarthy | H04L 43/10 |
| 2019/0306796 A1 | 10/2019 | Yagi | |
| 2020/0150734 A1 | 5/2020 | Ma et al. | |

OTHER PUBLICATIONS

Hristo Trifonov, "Traffic-Aware Adaptive Polling Mechanism for High Performance Packet Processing", Department of Electronic & Computer Engineering Research Report, University of Limerick, 2017.

* cited by examiner

ADAPTIVE POLLING IN SOFTWARE-DEFINED NETWORKING (SDN) ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtual machines (VMs) running different operating systems may be supported by the same physical machine (e.g., referred to as a "host"). Each VM is generally provisioned with virtual resources to run an operating system and applications. Further, through SDN, benefits similar to server virtualization may be derived for networking services. For example, logical overlay networks may be provisioned, changed, stored, deleted and restored programmatically without having to reconfigure the underlying physical hardware architecture. In practice, network device(s) may be deployed in the SDN environment to perform packet processing to facilitate communication between endpoints, such as VMs, etc. However, the network device(s) generally operate in a polling mode that constantly checks for incoming packets, which may not be efficient at all times.

DETAILED DESCRIPTION

Figure 1:
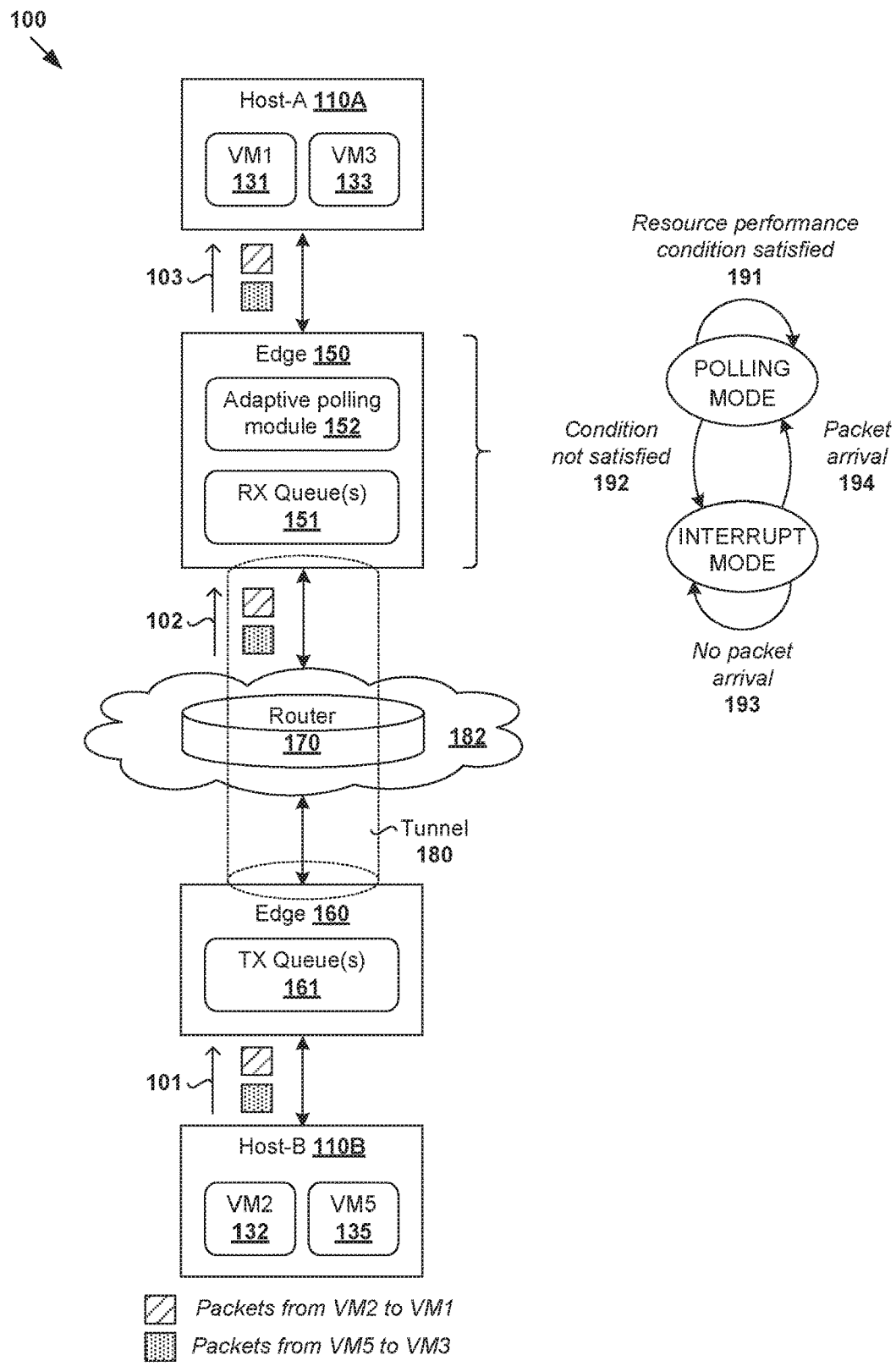
FIG. 1 is a schematic diagram illustrating an example software-defined networking (SDN) environment in which adaptive polling may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 2:
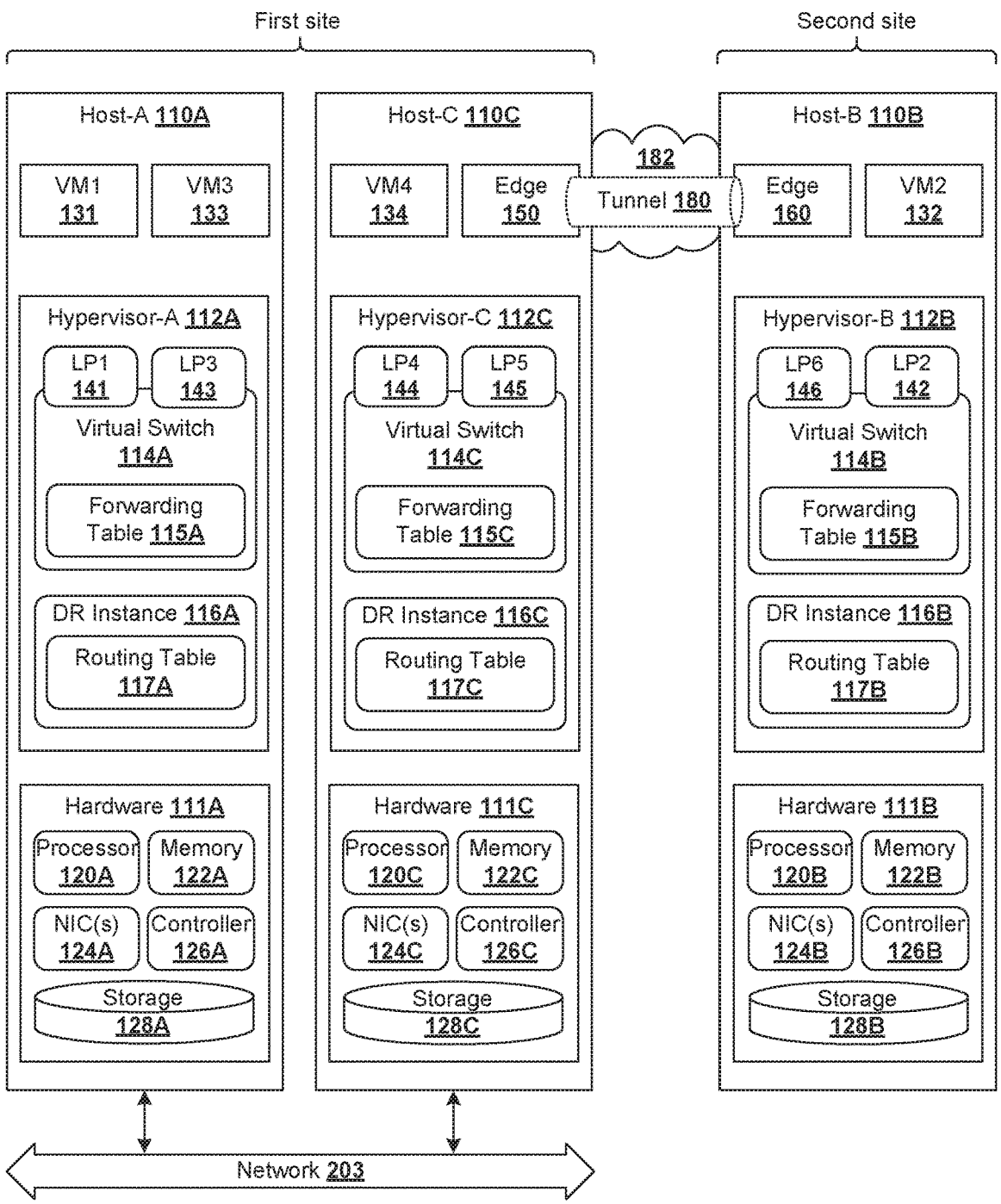
FIG. 2 is a schematic diagram illustrating an example physical view of the SDN environment in FIGS. 1.

Challenges relating to packet processing by network devices will now be explained using FIG. 1 and FIG. 2. In particular, FIG. 1 is a schematic diagram illustrating example software-defined networking (SDN) environment 100 in which adaptive polling may be performed. FIG. 2 is a schematic diagram illustrating example physical view 200 of SDN environment 100 in FIG. 1. It should be understood that, depending on the desired implementation, SDN environment 100 may include additional and/or alternative components than that shown in FIG. 1 and FIG. 2. In practice, SDN environment 100 may include any number of hosts (also known as "computer systems," "computing devices", "host computers", "host devices", "physical servers", "server systems", "transport nodes," etc.). Each host may be supporting any number of virtual machines (e.g., tens or hundreds).

Referring first to FIG. 1, SDN environment 100 includes multiple hosts, such as host-A 110A and host-B 110B that are connected via a pair of edges ("network devices") 150-160 and physical network 182. In practice, hosts 110A-B may be located at geographically dispersed sites, such host-A 110A at a first site and host-B 110B at a second site. To facilitate communication between hosts 110A-B over physical network 182, first edge 150 may be deployed at the edge of the first site, and second edge 160 at the edge of the second site. In practice, edge 150/160 may be any suitable network device that is implemented using one or more virtual machines (VMs) and/or physical machines (also known as "bare metal machines") capable of performing functionalities of a switch, router, bridge, gateway, any combination thereof, etc.

Referring also to FIG. 2, first edge 150 and second edge 160 may be VMs supported by respective host-C 110C and host-B 110B. Hosts 110A-C may each include suitable hardware and virtualization software (e.g., hypervisors 112A-C) to support various VMs. For example, at the first site, host-A 110A supports VM1 131 and VM3 133, and host-C 110C supports first edge 150 and VM4 134. At the second site, host-B 110B supports second edge 160, VM2 132, and VM5 135 (not shown for simplicity). In alternative implementation(s), it should be understood that first edge 150 may be supported by the same host as VM1 131, and/or second edge 160 supported by a different host compared to VM2 132. Host-A 110A and host-C 110C may be connected via any suitable physical network 203.

Hypervisor 112A/112B/112C maintains a mapping between underlying hardware 111A/111B/111C and virtual resources allocated to the VMs. Hardware 111A/111B/111C includes various physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications, such as virtual central processing unit (CPU), guest physical memory, virtual disk(s) and virtual network interface controller (VNIC). Hypervisor 112A/112B/112C further implements virtual switch 114A/114B/114C and logical distributed router (DR) instance 116A/116B/116C to handle egress packets from, and ingress packets to, respective VMs.

In practice, logical switches and logical distributed routers may be implemented in a distributed manner and can span multiple hosts 110A-C to connect the VMs. For example, a logical switch may be configured to provide logical layer-2 connectivity to VMs supported by different hosts. The logical switch may be implemented collectively by virtual switches 114A-C of respective hosts 110A-C and represented internally using forwarding tables (e.g., 115A-

C) at the respective virtual switches 114A-C. Further, logical distributed routers that provide logical layer-3 connectivity may be implemented collectively by distributed router (DR) instances (e.g., 116A-C) of respective hosts 110A-C and represented internally using routing tables (e.g., 117A-C) at the respective DR instances. Routing tables 117A-C may be each include entries that collectively implement the respective logical distributed routers.

In the example in FIG. 1 and FIG. 2, edge 150/160 may implement a logical service router (SR), which represents a centralized routing component that is deployed to provide centralized stateful services, such as firewall protection, load balancing, network address translation (NAT), etc. In a data center with multiple tenants requiring isolation from each other, a multi-tier topology may be used. For example, a two-tier topology includes an upper tier associated with a provider logical router (PLR) and a lower tier associated with a tenant logical router (TLR). Each tier may include both DRs and SRs, or DRs and SRs on the upper tier (known as "tier-0") but only DRs at the lower tier (known "tier-1"). The multi-tiered topology enables both the provider (e.g., data center owner) and tenant (e.g., data center tenant) to control their services and policies. Each tenant has full control over its TLR policies, whereas common PLR policies may be applied to different tenants. As such, a logical router may be categorized as one of the following types: TLR-DR, TLR-SR, PLR-DR and PLR-SR.

The VMs (e.g., VMs 131-134, first edge 150 and second edge 160) may send and receive packets via respective logical ports 141-146. As used herein, the term "logical port" may refer generally to a port on a logical switch to which a virtualized computing instance is connected. A "logical switch" may refer generally to an SDN construct that is collectively implemented by virtual switches of hosts 110A-C, whereas a "virtual switch" (e.g., 114A-C) may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system.

As used herein, the term "hypervisor" may refer generally to a software layer or component that supports the execution of multiple virtualized computing instances, including system-level software in guest virtual machines that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

Through virtualization of networking services in SDN environment 100, logical overlay networks may be provisioned, changed, stored, deleted and restored programmatically without having to reconfigure the underlying physical hardware architecture. Any suitable protocol(s) may be used to facilitate communication via logical overlay networks, Generic Routing Encapsulation (GRE), Internet Protocol Security (IPSec), Virtual eXtensible Local Area Network (VXLAN), Stateless Transport Tunneling (STT), Virtual Local Area Network (VLAN), Generic Network Virtualization Encapsulation (GENEVE), Network Virtualization using Generic Routing Encapsulation (NVGRE), Layer 2 Tunneling Protocol (L2TP), any combination thereof, etc.

Depending on the desired implementation, first edge 150 and second edge 160 may communicate via a Virtual Private Network (VPN), such as Layer-2 VPN (L2VPN), Layer-3 VPN (L3VPN), etc. In this case, tunnel 180 may be established using any suitable protocol(s) between first edge 150 and second edge 160 to facilitate packet forwarding over physical network 182. In practice, first edge 150 and second edge 160 may be connected via any suitable intermediate device(s), an example of which is router 170 in physical network 182. Each edge 150/160 may implement an egress packet processing datapath to perform packet processing on egress (i.e., outgoing) packets, and an ingress packet processing datapath to perform packet processing on ingress (i.e., incoming) packets. The term "packet processing" may refer generally to any suitable operation(s) performed by edge 150/160, such as packet encapsulation and/or decapsulation, encryption and/or decryption to facilitate secure communication over tunnel 180, etc.

In the example in FIG. 1, consider a scenario where VM2 132 sends packets to VM1 131, and VM5 135 sends packets to VM3 133. In this case, the (egress) packets originating from source VM2 132 and VM5 135 may enter into transmit (TX) queue(s) 161 of second edge 160 for processing before being forwarded over tunnel 180. At first edge 150, the (ingress) packets may enter into receive (RX) queue(s) 151 of first edge 150 for processing before being forwarded to destination VM1 131 and VM3 133. Depending on the desired implementation, RX queue(s) 151 may be implemented by physical NIC(s) of first edge 150 (when implemented as a physical machine), or virtual NIC(s) of first edge 150 (when implemented as a virtual machine).

In practice, any suitable data-plane packet processing engine(s) may be implemented to perform packet processing at edge 150/160. One example is the Data Plane Development Kit (DPDK) that provides a set of data plane libraries and (physical or virtual) NIC drivers to accelerate fast packet processing at edge 150/160. However, DPDK-based data plane implements a packet sampling scheme that usually has a high polling frequency. In this case, first edge 150 may constantly attempt to poll packets from RX queue(s)

151 of a NIC, regardless of whether there are packets available in the RX queue(s) 151. This mode of operation is called polling mode, which necessitates a (physical or virtual) CPU of first edge 150 to run at substantially 100% utilization. The polling mode is generally useful when the traffic load is heavy, but highly resource-inefficient when the traffic load is light. For example in FIG. 2, when edge 150 is deployed in a VM form, edge 150 shares CPU resources with other VMs (e.g., VM4 134) running on the same hypervisor-C 110C. Occupying the CPU at 100% (in the polling mode) without presence of heavy traffic is a waste of shared CPU resources.

Conventionally, heuristics-based approaches have been proposed to improve efficiency. One conventional approach is to switch from a polling mode to an interrupt mode after a fixed number of zero-polling rounds where no packet is polled (e.g., ten zero-polling rounds). The fixed number is usually set arbitrarily, such as based on a default setting, a network administrator's experience (e.g., switch to the interrupt mode after ten zero-polling rounds), etc. Unlike the polling mode, the interrupt mode "wakes up" the CPU when packets are received, thereby reducing CPU utilization. Another conventional approach is to insert a delay between two consecutive zero polling rounds to reduce the polling frequency. After a fixed number of zero polling rounds (e.g., 100 zero loops), the delay-based approach switches to the interrupt mode. In practice, however, switching to the interrupt mode after a fixed number of rounds may lack flexibility, and these conventional approaches may not adapt to traffic load that changes dynamically in SDN environment 100. In this case, packet processing performance at edge 150/160, as well as the overall network performance, may be affected.

Adaptive Polling

According to examples of the present disclosure, packet processing may be performed in an improved manner using an adaptive algorithmic approach. Instead of necessitating edge 150 to switch from a polling mode to an interrupt mode after a "fixed number" of zero-polling rounds (e.g., ten or 100 rounds), the decision may be made dynamically at run time based on real traffic dynamics. In particular, edge 150 may determine whether a resource performance condition (e.g., CPU efficiency) is satisfied based on packet characteristic information capturing. If the resource performance condition is not satisfied, the interrupt mode may be used instead of the polling mode.

Examples of the present disclosure may be implemented to address the problem of having multiple optimization targets during packet processing, such as (a) packet processing throughput and (b) resource performance (e.g., CPU performance, or more particularly CPU efficiency or utilization). In practice, it is generally difficult to satisfy these optimization targets at the same time because the polling mode is better for throughout but the interrupt mode is better for CPU efficiency (particularly for low to medium traffic level). Instead of trying to satisfy these two optimization targets at the same time, examples of the present disclosure may optimize throughput while satisfying a design constraint in the form of a resource performance condition. This way, the data-plane thread at edge 150 may be configured to operate in the polling mode for as long as possible to optimize throughput, until the resource performance condition is no longer satisfied. The traffic-aware approach is adaptive in nature.

Figure 3:
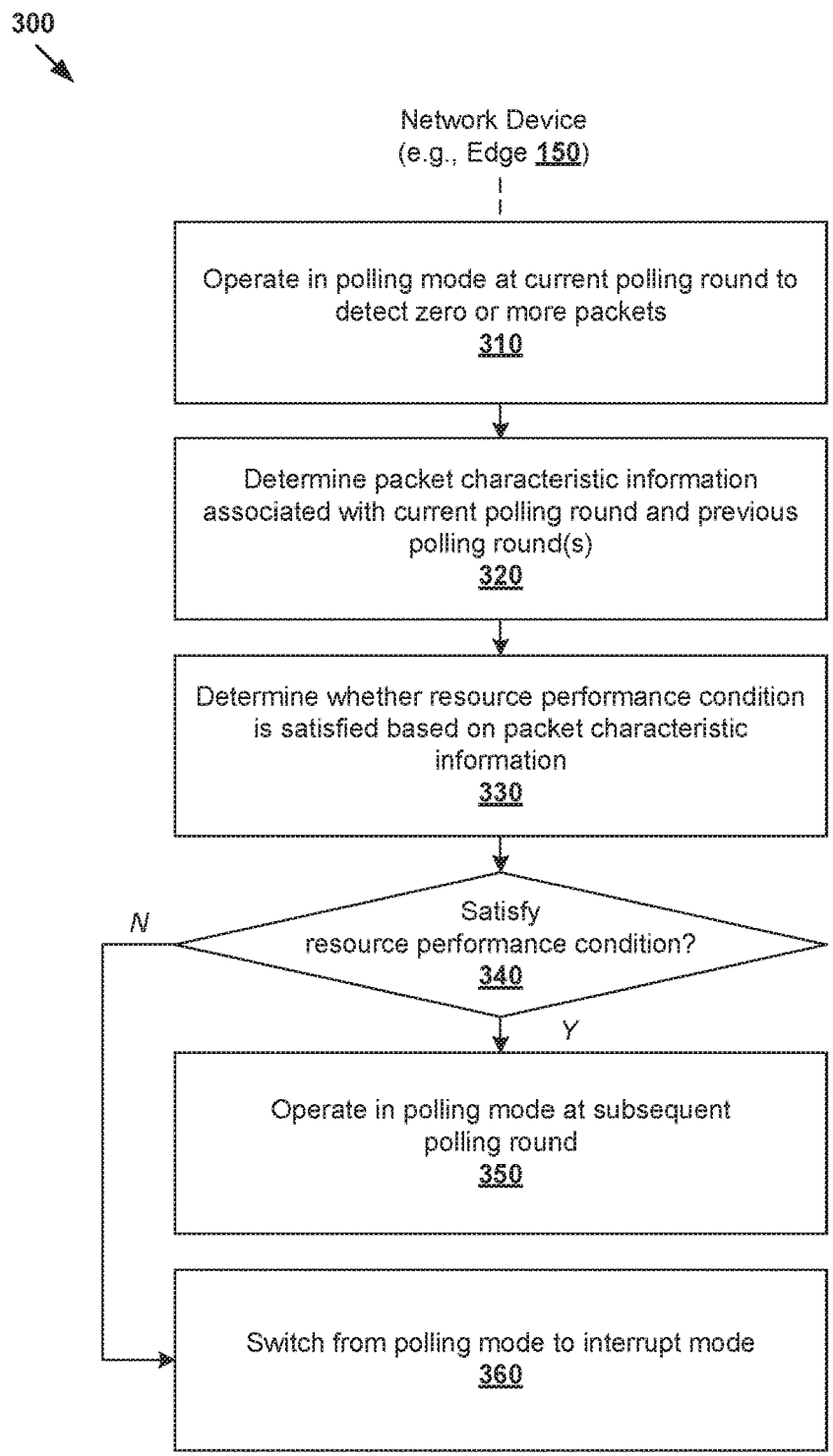
FIG. 3 is a flowchart of an example process for a network device to perform adaptive polling in an SDN environment.

In more detail, FIG. 3 is a flowchart of example process 300 for a network device to perform adaptive polling in SDN environment 100. Example process 300 may include one or more operations, functions, or actions illustrated by one or more blocks, such as 310 to 340. The various blocks may be combined into fewer blocks, divided into additional blocks, and/or eliminated depending on the desired implementation. Throughout the present disclosure, various examples will be explained using edge 150 located at the edge of a first site as an example "network device" that facilitate communication between "first node" or "first virtualized computing instance" (e.g., VM1 131 or VM3 133) located at a first site; and "second node" or "second virtualized computing instance" (e.g., VM2 132 or VM5 135) located at a second site; etc. Examples of the present disclosure may be implemented by first edge 150 using any suitable module(s), such as adaptive polling module 152, etc. Transitions between a polling mode and an interrupt mode are also shown in FIG. 1.

At 310 in FIG. 3, edge 150 operates in a polling mode at a current polling round to detect zero or more packets that require packet processing by edge 150. At 320, edge 150 determines packet characteristic information associated with multiple polling rounds that include the current polling round and previous polling round(s). At 330, based on the packet characteristic information, edge 150 determines whether a resource performance condition associated with edge 150 is satisfied.

At 340 in FIG. 3, in response to determination that the resource performance condition is satisfied (see also 191 in FIG. 1), edge 150 continues to operate in the polling mode at a subsequent polling round. Otherwise, at 350, edge 150 switches from the polling mode to an interrupt mode (see 192 in FIG. 1). When operating in the interrupt mode, a CPU core or packet processing thread that is configured to perform packet processing at edge 150 may sleep until the next packet arrives (see 193 in FIG. 1). In response to detecting an interrupt indicating an arrival of at least one packet, edge 150 may switch from the interrupt mode to the polling mode (see 194 in FIG. 1).

Depending on the desired implementation, the resource performance condition may be a CPU performance condition associated with CPU(s) of edge 150, such as physical CPU(s), virtual CPU(s) supported by hypervisor 112C in FIG. 2, etc. As will be discussed further using FIG. 4, edge 150 may set the CPU performance condition based on one or more of the following: a CPU packet processing rate (R), a CPU clock frequency (F) and a relaxation factor ($\alpha$). It should be understood that any additional and/or alternative resource performance condition(s) may be used.

Depending on the desired implementation, the packet characteristic information may be any suitable information, such as a time interval (interval), a total number of packets (total), etc. As will be discussed further using FIG. 4, edge 150 may determine the time interval (interval) between a current timestamp (e.g., $t_j$) associated with the current polling round and a previous timestamp (e.g., t(idx)) associated with an oldest previous polling round. Edge 150 may determine the total number of packets (total) that have been detected during the current polling round and previous polling round(s). The packet characteristic information may be retrieved from a moving average window maintained by the network device to track traffic dynamics at run time. In the following, various examples will be discussed with FIG. 3 to FIG. 6.

Detailed Examples

Figure 4:
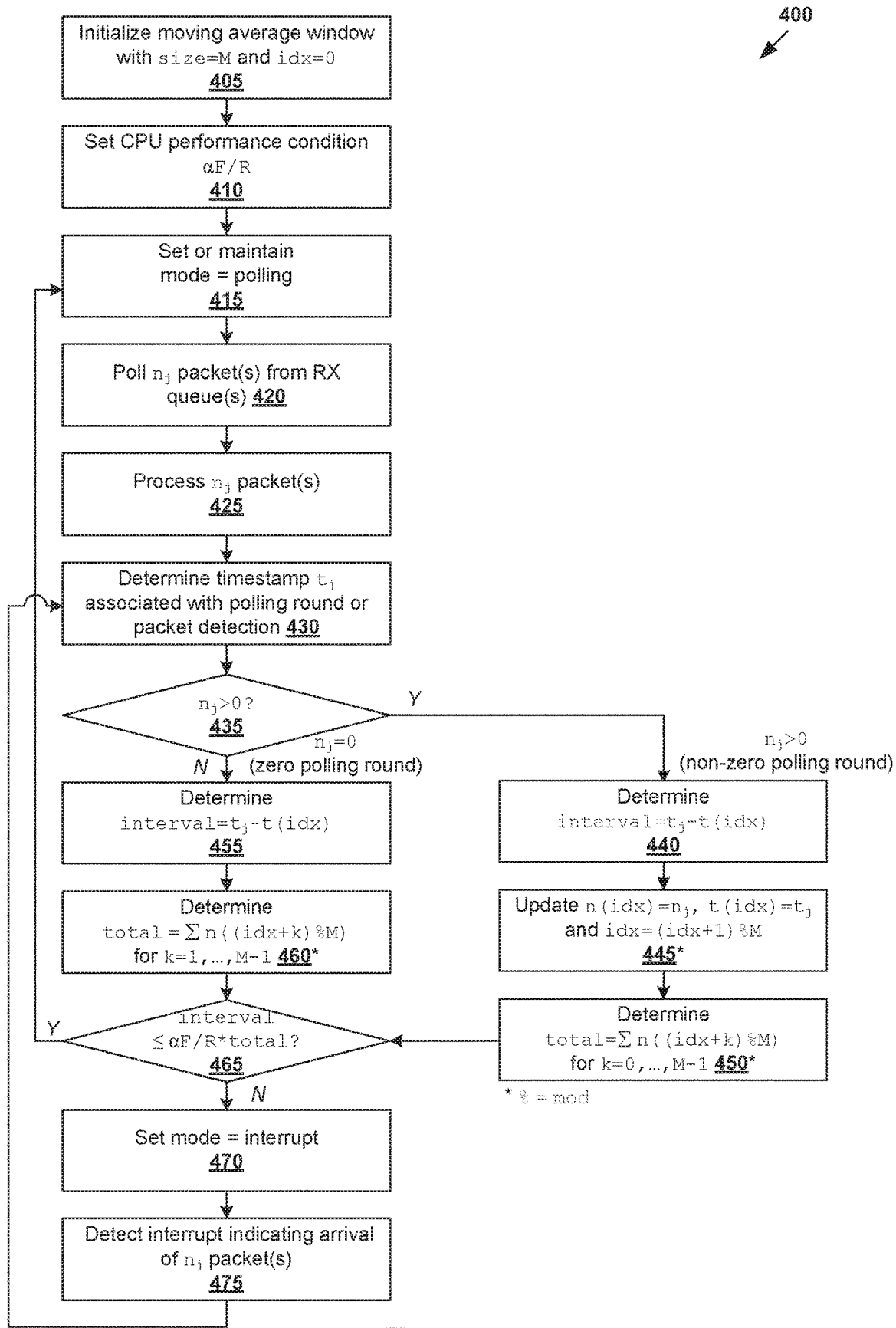
FIG. 4 is a flowchart of an example detailed process for a network device to perform adaptive polling in an SDN environment.
Figure 5:
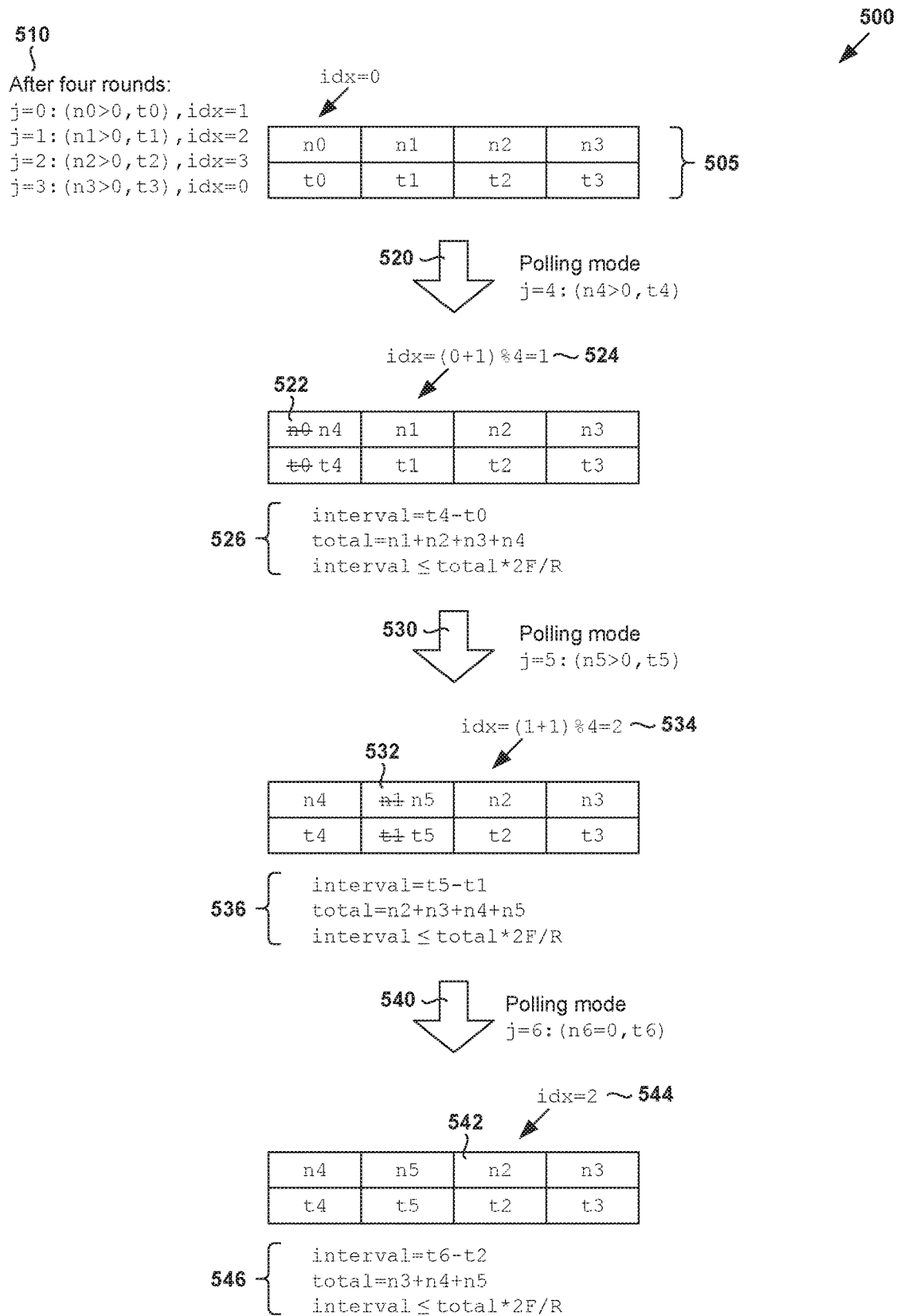
FIG. 5 is a schematic diagram illustrating an example of a network device operating in a polling mode in the SDN environment in FIG. 1.
Figure 6:
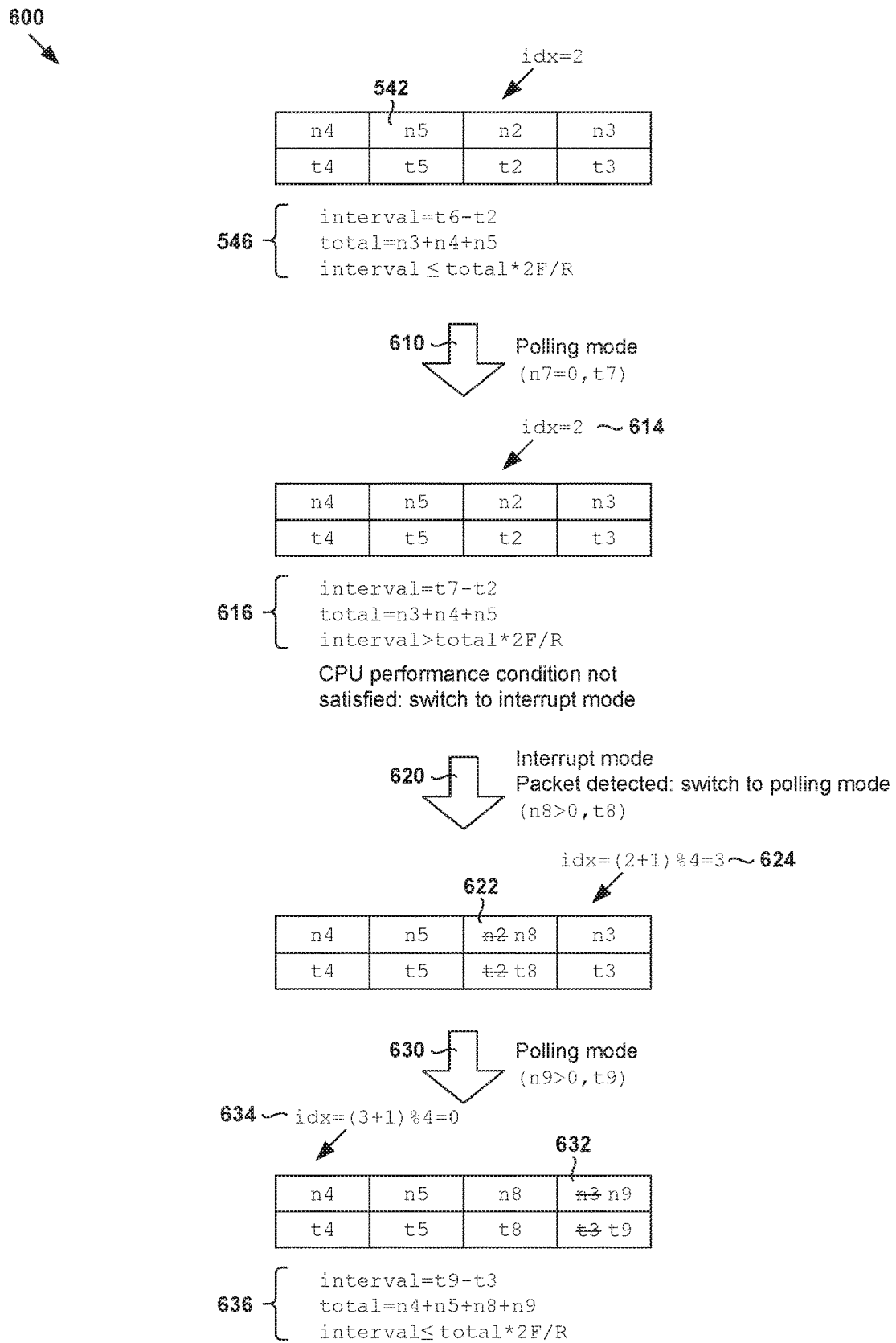
FIG. 6 is a schematic diagram illustrating an example of a network device switching to an interrupt mode in the SDN environment in FIG. 1.

FIG. 4 is a flowchart of example detailed process 400 for a network device to perform adaptive polling in SDN environment 100. Example process 400 may include one or more operations, functions, or actions illustrated by one or more blocks, such as 405 to 475. The various blocks may be combined into fewer blocks, divided into additional blocks, and/or eliminated depending on the desired implementation. The example in FIG. 4 will be explained using FIG. 5 and FIG. 6. FIG. 5 is a schematic diagram illustrating example 500 of network device 150 operating in a polling mode in SDN environment 100 in FIG. 1. FIG. 6 is a schematic diagram illustrating example 600 of network device 150 switching to an interrupt mode in SDN environment 100 in FIG. 1.

(a) Initialization

At 405 in FIG. 4, a moving average window (see 505 in FIG. 5) is initialized with size M=4 and current index idx=0 for tracking packet characteristic information. Each $i^{th}$ entry in moving average window 505 stores (n(i), t(0), where n(i)=number of packets polled during a particular polling round, t(i)=timestamp (e.g., in CPU cycles) associated with the polling round and i=0, ..., M−1. As will be explained further below, current index idx is initialized to zero to track the oldest entry in moving average window 505, and incremented by one (0≤idx≤M−1) at each non-zero polling round.

At 410 in FIG. 4, a CPU performance condition denoted as C=αF/R is initialized at edge 150, where R=CPU packet processing rate at 100% CPU utilization (e.g., in packets per second (pps)) and F=CPU clock frequency (e.g., in Hertz (Hz)). In this case, edge 150 takes F/R number of CPU cycles to process each packet. Using a relaxation factor of α=2, C=2F/R represents a design constraint that sets the maximum number of CPU cycles that may be used to process a packet in order to achieve at least 50% CPU efficiency on packet processing.

In practice, parameter R may represent a peak CPU packet processing rate that is measurable on a processor (e.g., physical CPU, virtual CPU) using certain pressure throughput testing. Additionally and/or alternatively, parameter R may depend on the features and functionalities enabled on first edge 150. CPU performance condition C provides a certain CPU efficiency guarantee when switching between polling and interrupt modes. The value of relaxation factor α may be set depending on the desired implementation. A larger value of α relaxes the CPU efficiency constraint and potentially leads the data plane to operate in the polling mode for a longer period of time. A smaller value of a sets a more rigorous CPU efficiency constraint that may lead to a sooner entry into the interrupt mode.

(b) Operating in Polling Mode

At 415 and 420 in FIG. 4, edge 150 operates in a polling mode during a polling round to poll or detect $n_j$=number of packet(s) from RX queue(s) 151. In practice, it should be understood that a CPU core (or a data-plane packet processing thread) at edge 150 may poll packets from different RX queue(s) 151 at different NIC(s). The number of polled packets ($n_j$) represents the total number polled.

At 425 in FIG. 4, edge 150 processes the zero or more $n_j$ packet(s) according to any suitable approach, such as performing decapsulation to remove an outer header of each packet, forwarding decapsulated packet(s) to their destination, etc. Next, at 430, edge 150 determines $t_j$=timestamp associated with the polling round. In the case of $n_j$>0 (i.e., non-zero polling round), timestamp $t_j$ includes the processing time for the $n_j$ packet(s). Further, at 440 and 445, in response to determination that $n_j$>0, edge 150 determines interval=$t_j$−t(idx), updates moving average window 505 by setting n(idx)=$n_j$ and t(idx)=$t_j$ before incrementing the current index by setting idx=(idx+1) mod M. This way, index is always pointing to the oldest entry in moving average window 505.

Some examples are shown in FIG. 5. After four non-zero polling rounds (see 510), moving average window 505 stores the following entries: (n0>0, t0), (n1>0, t1), (n2>0, t2) and (n3>0, t3). The index idx is incremented at each of the non-zero polling rounds in a cyclic manner according to block 445 in FIG. 4. In particular, starting with idx=0 prior to the first round, edge 150 increments idx=(0+1) %4=1 after the first round, idx=(1+1) %4=2 after the second round, idx=(2+1) %4=3 after the third round, and idx=(3+1) %4=0 again after the fourth round. Depending on the desired implementation, any suitable data structure may be used to store moving average window 505, such as a cyclic buffer, linked list, etc.

At a subsequent non-zero polling round (see 520 in FIG. 5), edge 150 polls n4 packets and records timestamp=t4 after packet processing. Since n4>0, edge 150 updates the moving average window by replacing the oldest entry with n(idx=0)=n4 and t(idx=0)=t4 (see 522 in FIG. 5). Index idx=(0+1) %4=1 (see 524 in FIG. 5) is then incremented according to block 440 in FIG. 4.

Next, edge 150 may then determine whether to maintain operation in the polling mode, or switch to the interrupt mode as follows. In particular, at 440, 445, 450 and 465 in FIG. 5, edge 150 determines whether CPU performance condition αF/R may be satisfied based on packet characteristic information associated with multiple polling rounds in moving average window 505. If yes (satisfied), edge 150 continues to operate in the polling mode in a subsequent polling round according to block 415. Otherwise (not satisfied), edge 150 switches from polling mode to interrupt mode according to block 470.

In one example, edge 150 may determine packet characteristic information that includes a time interval (denoted as interval) and a total number of packets (denoted as total) using moving average window 505. In more detail, referring to 440 in FIG. 4, edge 150 determines interval=$t_j$−t(idx), which represents a time period that has elapsed between the latest non-zero polling round and the oldest non-zero polling round recorded. In the example in FIG. 5 (see 526), interval=t4−t(idx=0)=t4−t0. At 445 and 450, edge 150 updates idx=(0+1) %4=1 before determining total=$\Sigma_{k=0}^{M-1}$n((idx+k) % M)=n1+n2+n3+n4, which represents a total number of packets detected during the most recent M non-zero polling rounds in the moving average window. In response to determination that interval≤total*2F/R (i.e., CPU performance condition satisfied), edge 150 maintains operation in the polling mode.

The above may be repeated at subsequent non-zero polling rounds. In another example in FIG. 5 (see 530), edge 150 polls n5>0 packets and records timestamp=t5 after packet processing. As such, edge 150 determines interval=t5−t(idx=1)=t5−t1, updates the moving average window with n(idx=1)=n5 and t(idx=1)=t5 (see 532) and then increments idx=(1+1) %4=2 (see 534). Next, edge 150 determines total=$\Sigma_{k=0}^{M-1}$n((2+k) % M)=n2+n3+n4+n5 (see 536). In response to determination that interval≤total*2F/R (i.e., CPU performance condition satisfied), edge 150 once again operates in the polling mode.

The decision of whether to switch from polling mode to interrupt mode may also be made during zero-polling rounds, where no packet is polled from RX queue(s) 151 at edge 150. In particular, in response to determination that n6=0 (i.e., zero polling round) at 540 in FIG. 5, edge 150 determines interval=t6−t(idx=2)=t6−t2 and total=$\Sigma_{k=0}^{M-1}$n((2+k) % M)=n3+n4+n5 (see 546). In the example in FIG. 5, edge 150 once again maintains operation in the polling mode because interval <total*2F/R (i.e., CPU performance condition satisfied). See corresponding blocks 455 and 460 in FIG. 4. Since n6=0, it is not necessary to update the oldest entry in the moving average window and index idx=2 (see 542 and 544).

(b) Switching to Interrupt Mode

In another example in FIG. 6 (see 610), edge 150 polls zero packet (i.e., n7=0) and records timestamp=t7. Once again, since this is a zero-polling round, it is not necessary to update the moving average window and index idx=2 (see 614). Edge 150 then determines interval=t7−t(idx=2)=t7−t2 and total=$\Sigma_{k=0}^{M-1}$n((2+k) % M)=n3+n4+n5 (see 616). In response to determination that interval>total*2F/R (i.e., CPU performance condition not satisfied), edge 150 switches from the polling mode to the interrupt mode according to block 470 in FIG. 4.

(c) Switching to Polling Mode

Unlike the polling mode, edge 150 does not need to constantly check RX queue(s) 151 for incoming packets when operating in the interrupt mode, thereby improving CPU efficiency. A thread or CPU core executing example process 400 in FIG. 4 may sleep until a new packet is received by RX queue(s) 151 at a physical or virtual NIC associated with edge 150. The new packet triggers an interrupt to wake up the thread, after which execution is resumed in the polling mode.

At 475 in FIG. 4, in response to detecting an interrupt indicating an arrival of at least one packet at RX queue(s) 151, edge 150 switches from the interrupt mode to polling mode. Using the example in FIG. 6 (see 620), edge 150 may detect a burst of packets (n8>0) and records timestamp=t8 after packet processing. As such, edge 150 updates the moving average window with n(idx=2)=n8 and t(idx=2)=t8 (see 622) before incrementing idx=(2+1) %4=3 (see 624).

At a subsequent non-zero polling round, (see 630 in FIG. 6), edge 150 polls n9>0 packets and records timestamp=t9 after packet processing. As such, edge 150 calculates interval=t9−t(idx=3)=t9−t3, updates the moving average window with n(idx=3)=n9 and t(idx=3)=t9 (see 632) before incrementing idx=(3+1) %4=0 (see 634). Edge 150 then determines total=$\Sigma_{k=0}^{M-1}$n((idx+k) % M)=n4+n5+n8+n9 (see 636). In response to determination that interval≤total*2F/R (i.e., CPU performance condition satisfied), edge 150 once again maintains operation in the polling mode.

According to examples of the present disclosure, an adaptive polling approach that is traffic-aware and adaptive by nature may be implemented to improve packet processing. When traffic is heavy (e.g., with back-to-back packets), the CPU performance condition should always be satisfied to optimize packet processing efficiency by operating in the polling mode. When traffic becomes lighter (e.g., line becomes idle), the moving average (e.g., in terms of time interval described above) increases to a point where interval>total*αF/R. In this case, switching to the interrupt mode to save on CPU cycles required for polling. Once the traffic intensity increases again, the relaxation factor (a) may help satisfying the CPU performance condition again. In this case, switching back to the polling mode to improve packet processing efficiency. Unlike some conventional approaches, examples of the present disclosure may be implemented without increasing the delay (either linearly or exponentially) between non-zero polling rounds.

Container Implementation

Although discussed using VMs 131-134, it should be understood that Adaptive polling may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 11s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. Using the examples in FIGS. 1-6, adaptive polling may be performed to facilitate communication among containers in SDN environment 100.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as a host may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network device to perform adaptive polling in a software-defined networking (SDN) environment, the method comprising:
    operating in a polling mode at a current polling round to detect zero or more packets at a receive queue that require packet processing by the network device;
    determining packet characteristic information associated with multiple polling rounds that include the current polling round and one or more previous polling rounds;
    based on the packet characteristic information, determining whether a resource performance condition associated with the network device is satisfied; and
    in response to determination that the resource performance condition is satisfied, operating in the polling mode at a subsequent polling round; but otherwise, switching from the polling mode to an interrupt mode in which the network device goes to sleep and remains asleep until triggered to return from the interrupt mode to the polling mode in response to an interrupt indicating arrival of at least one packet at the receive queue.

2. The method of claim 1, further comprising:
    setting the resource performance condition as a central processing unit (CPU) performance condition based on one or more of: a CPU packet processing rate, a CPU clock frequency, and a relaxation factor.

3. The method of claim 1, wherein determining the packet characteristic information comprises:
    determining the packet characteristic information that includes a time interval between a current timestamp associated with the current polling round and a previous timestamp associated with an oldest previous polling round among the one or more previous polling rounds.

4. The method of claim 1, wherein determining the packet characteristic information comprises:
    determining the packet characteristic information that includes a total number of packets detected during the current polling round and the one or more previous polling rounds.

5. The method of claim 1, wherein determining the packet characteristic information comprises:
    retrieving at least part of the packet characteristic information from a moving average window maintained by the network device.

6. The method of claim 5, further comprising:
    in response to determination that at least one packet is detected at the current polling round, updating the moving average window to store (a) a current timestamp associated with the current polling round and (b) a number of the at least one packet polled at the current polling round.

7. A non-transitory computer-readable storage medium that includes a set of instructions which, in response to execution by a processor of a network device, cause the processor to perform a method for adaptive polling in a software-defined networking (SDN) environment, wherein the method comprises:
    operating in a polling mode at a current polling round to detect zero or more packets at a receive queue that require packet processing by the network device;
    determining packet characteristic information associated with multiple polling rounds that include the current polling round and one or more previous polling rounds;
    based on the packet characteristic information, determining whether a resource performance condition associated with the network device is satisfied; and
    in response to determination that the resource performance condition is satisfied, operating in the polling mode at a subsequent polling round; but otherwise, switching from the polling mode to an interrupt mode in which the network device goes to sleep and remains asleep until triggered to return from the interrupt mode to the polling mode in response to an interrupt indicating arrival of at least one packet at the receive queue.

8. The non-transitory computer-readable storage medium of claim 7, wherein the method further comprises:
    setting the resource performance condition as a central processing unit (CPU) performance condition based on one or more of: a CPU packet processing rate, a CPU clock frequency, and a relaxation factor.

9. The non-transitory computer-readable storage medium of claim 7, wherein determining the packet characteristic information comprises:
    determining the packet characteristic information that includes a time interval between a current timestamp associated with the current polling round and a previous timestamp associated with an oldest previous polling round among the one or more previous polling rounds.

10. The non-transitory computer-readable storage medium of claim 7, wherein determining the packet characteristic information comprises:
    determining the packet characteristic information that includes a total number of packets detected during the current polling round and the one or more previous polling rounds.

11. The non-transitory computer-readable storage medium of claim 7, wherein determining the packet characteristic information comprises:
    retrieving at least part of the packet characteristic information from a moving average window maintained by the network device.

12. The non-transitory computer-readable storage medium of claim 11, wherein the method further comprises:
    in response to determination that at least one packet is detected at the current polling round, updating the moving average window to store (a) a current timestamp associated with the current polling round and (b) a number of the at least one packet polled at the current polling round.

13. A network device configured to perform adaptive polling in a software-defined networking (SDN) environment, the network device comprising:

a processor; and a non-transitory computer-readable medium having stored thereon instructions that, in response to execution by the processor, cause the processor, to:

operate in a polling mode at a current polling round to detect zero or more packets at a receive queue that require packet processing by the network device;

determine packet characteristic information associated with multiple polling rounds that include the current polling round and one or more previous polling rounds;

based on the packet characteristic information, determine whether a resource performance condition associated with the network device is satisfied; and in response to determination that the resource performance condition is satisfied, operate in the polling mode at a subsequent polling round; but otherwise, switch from the polling mode to an interrupt mode in which the network device goes to sleep and remains asleep until triggered to return from the interrupt mode to the polling mode in response to an interrupt indicating arrival of at least one packet at the receive queue.

14. The network device of claim 13, wherein the instructions further cause the processor to:

set the resource performance condition as a central processing unit (CPU) performance condition based on one or more of: a CPU packet processing rate, a CPU clock frequency, and a relaxation factor.

15. The network device of claim 13, wherein the instructions that cause the processor to determine the packet characteristic information cause the processor to:

determine the packet characteristic information that includes a time interval between a current timestamp associated with the current polling round and a previous timestamp associated with an oldest previous polling round among the one or more previous polling rounds.

16. The network device of claim 13, wherein the instructions that cause the processor to determine the packet characteristic information cause the processor to:

determine the packet characteristic information that includes a total number of packets detected during the current polling round and the one or more previous polling rounds.

17. The network device of claim 13, wherein the instructions that cause the processor to determine the packet characteristic information cause the processor to:

retrieve at least part of the packet characteristic information from a moving average window maintained by the network device.

18. The network device of claim 17, wherein the instructions further cause the processor to:

in response to determination that at least one packet is detected at the current polling round, update the moving average window to store (a) a current timestamp associated with the current polling round and (b) a number of the at least one packet polled at the current polling round.

* * * * *